(12) United States Patent
Shanmugasundaram et al.

(10) Patent No.: US 11,335,110 B2
(45) Date of Patent: May 17, 2022

(54) SYSTEMS AND METHODS FOR PROCESSING A TABLE OF INFORMATION IN A DOCUMENT

(71) Applicant: Verizon Patent and Licensing Inc., Basking Ridge, NJ (US)

(72) Inventors: Saravanan Shanmugasundaram, Ashburn, VA (US); Krishna K. Talluri, Ashburn, VA (US); Keerthi Mitta, Leesburg, VA (US); Dinesh Agarwal, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 126 days.

(21) Appl. No.: 16/985,914

(22) Filed: Aug. 5, 2020

(65) Prior Publication Data

US 2022/0044011 A1  Feb. 10, 2022

(51) Int. Cl.
| | |
|---|---|
| *G06K 9/00* | (2022.01) |
| *G06V 30/412* | (2022.01) |
| *G06T 3/60* | (2006.01) |
| *G06F 40/177* | (2020.01) |
| *G06K 9/62* | (2022.01) |
| *G06T 5/00* | (2006.01) |
| *G06V 10/40* | (2022.01) |

(Continued)

(52) U.S. Cl.
CPC .......... *G06V 30/412* (2022.01); *G06F 40/177* (2020.01); *G06K 9/6217* (2013.01); *G06T 3/608* (2013.01); *G06T 5/002* (2013.01); *G06V 10/225* (2022.01); *G06V 10/40* (2022.01); *G06V 30/413* (2022.01); *G06T 2207/20084* (2013.01); *G06V 30/10* (2022.01)

(58) Field of Classification Search
CPC ........ G06K 9/202; G06K 9/2011; G06K 9/20; G06K 9/4609; G06K 9/48; G06K 9/40; G06K 9/56; G06K 9/00124; G06T 7/0083; G06T 7/0081; G06T 5/001; G06T 5/40; G06T 5/20; G06T 5/50; H04N 1/38; G11B 27/28
See application file for complete search history.

(56) References Cited

U.S. PATENT DOCUMENTS

| | | | |
|---|---|---|---|
| 8,150,165 B2 * | 4/2012 | Melikian | G06K 9/6202 382/190 |
| 8,782,515 B2 * | 7/2014 | Le Chevalier | G06F 40/154 715/236 |

(Continued)

*Primary Examiner* — Amir Alavi

(57) ABSTRACT

A device may receive document image data that includes an image of a document to be digitized. The device may detect, from the document image data, a table of information that is depicted in the image. The device may determine a data extraction score associated with a table image, wherein the data extraction score is associated with using a data conversion technique to convert the table image to digitized table data. The device may perform, based on the data extraction score not satisfying a threshold, a morphological operation on the table image to generate an enhanced table image that corresponds to an enhanced table of information associated with the table of information. The device may process, using the data conversion technique, the enhanced table image to extract the information from the enhanced table. The device may perform an action associated with the extracted information.

20 Claims, 8 Drawing Sheets

(51) Int. Cl.
  *G06V 10/22* (2022.01)
  *G06V 30/413* (2022.01)
  *G06V 30/10* (2022.01)

(56) References Cited

U.S. PATENT DOCUMENTS

| | | | | |
|---|---|---|---|---|
| 8,891,871 B2* | 11/2014 | Eguchi | .................. | G06K 9/2054 |
| | | | | 382/177 |
| 8,897,563 B1* | 11/2014 | Welling | ................... | G06K 9/48 |
| | | | | 382/173 |
| 8,948,515 B2* | 2/2015 | Boi | ........................ | G11B 27/34 |
| | | | | 382/195 |
| 9,069,732 B2* | 6/2015 | Le Chevalier | .......... | G06F 16/84 |
| 9,251,413 B2* | 2/2016 | Meier | ................. | G06K 9/00449 |
| 9,785,830 B2* | 10/2017 | Hausmann | ............ | G06K 9/6218 |
| 9,990,422 B2* | 6/2018 | Chang | ..................... | G06F 16/35 |
| 10,990,814 B2* | 4/2021 | Venkateswaran | ........................ | |
| | | | | G06K 9/00456 |
| 11,017,261 B1* | 5/2021 | Zheng | .................. | G06K 9/4652 |
| 2016/0371275 A1* | 12/2016 | Bernstein | ................ | G06F 40/18 |

* cited by examiner

SYSTEMS AND METHODS FOR PROCESSING A TABLE OF INFORMATION IN A DOCUMENT

BACKGROUND

Document processing includes converting typed text on paper-based and electronic documents (e.g., scanned image of a document) into electronic information using intelligent character recognition (ICR), optical character recognition (OCR), manual data entry, and/or the like.

DETAILED DESCRIPTION OF PREFERRED EMBODIMENTS

Figure 1A:
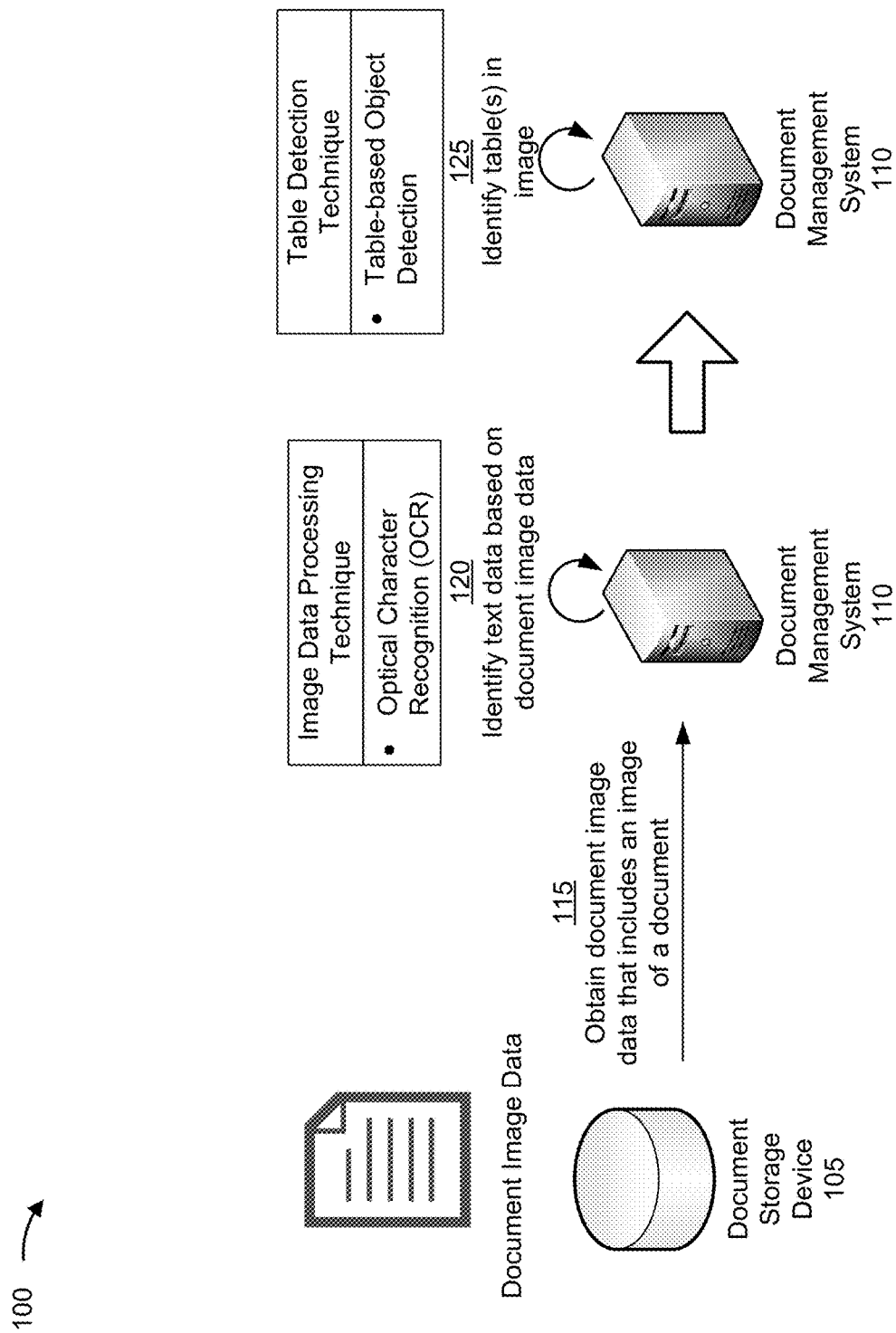
FIGS. 1A-1D are diagrams of an example implementation described herein.

The following detailed description of example implementations refers to the accompanying drawings. The same reference numbers in different drawings may identify the same or similar elements.

Current document processing techniques typically require manually copying or scanning documents into an image format, sorting the imaged documents, and converting the imaged documents into a digital format (e.g., digitizing the documents). Due to copying and/or scanning errors, such document processing techniques may result in inaccurate digitized documents. Furthermore, in many cases, these document processing techniques are unable to correctly digitize information contained in tables of the documents. Inaccuracies may be compounded when the table is depicted in an unstructured table (e.g., without lines, borders, dividers, and/or the like) and/or the table is poorly copied and/or scanned such that the table appears rotated and/or tilted when imaged, is associated with an amount of noise that makes the table appear unclear, and/or the like. Thus, current document processing techniques may waste computing resources (e.g., processing resources, memory resources, communication resources, and/or the like), networking resources, human resources, and/or the like associated with manually processing documents, generating digital forms of the documents with incorrect table information, correcting the incorrect table information if discovered, and/or like.

Some implementations described herein provide a system that correctly processes a table of information in a document. In some implementations, the system may detect (e.g., using a machine learning model) a table of information that is depicted in an image of document. The system (e.g., a document management system), may extract a table image of the table and may determine table image data of the table (e.g., that indicates whether the table is rotated, tilted, missing borders, associated with an amount of noise, and/or the like in the table image). The system may determine (e.g., using an additional machine learning model), based on the table image data, a data extraction score associated with the table image, wherein the data extraction score indicates whether the table image may be converted to digitized table data (e.g., without further processing). The system may perform, based on the data extraction score not satisfying a threshold, a morphological operation to the table image to generate an enhanced table image. The system may process, using a data conversion technique, the enhanced table image to extract information from the enhanced table and may perform an action associated with the extracted information (e.g., store the extracted information in a data structure with a digitized form of the document).

In this way, the system utilizes machine learning models, morphological operations, and/or the like to correctly extract table information from a copied and/or scanned document. The system enables a user to perform document processing (e.g., document information extraction) without involvement of additional users. This conserves computing resources, networking resources, and/or the like that would have otherwise been consumed in manually processing documents, generating digital forms of the documents with incorrect table information, correcting the incorrect table information, and/or like.

FIGS. 1A-1D are diagrams of an example 100 associated with processing a table of information in a document. As shown in FIGS. 1A-1D, example 100 includes a document storage device 105, a document management system 110, and/or a user device 160. In some implementations, the document storage device 105, the document management system 110, and/or the user device 160 may be connected via a network, such as a wired network (e.g., the Internet or another data network), a wireless network (e.g., a wireless local area network, a wireless wide area network, a cellular network, and/or the like), and/or the like.

As shown in FIG. 1A, and by reference number 115, the document management system 110 may obtain document image data. The document image data may include an image of a document (e.g., to be digitized into a digital form), such as a contract, a deal structure document, a payment schedule document, and/or the like. The image of the document may include one or more tables, where each table includes information organized by at least one row, column, header, cell, divider, and/or the like.

In some implementations, the document management system 110 may communicate with the document storage device 105 to obtain the document image data via a communication link between the document management system 110 and the document storage device 105. In some implementations, the document storage device 105 may store a corpus of document image data associated with multiple documents. For example, the corpus may include document image data associated with documents that were scanned using a document scanner, a digital camera, and/or the like. As another example the corpus may include document image data associated with non-machine readable digital documents, such as non-machine readable portable document format (PDF) documents, image file documents, and/or the like. The document storage device 105 may provide document image data associated with a document, of the multiple documents, to the document management system 110 (e.g., via the communication link).

As further shown in FIG. 1A, and by reference number 120, the document management system 110 may process the document image data to obtain text data associated with the image of the document. For example, the document management system 110 may use an optical character recognition (OCR) technique to process the image data to identify the text data associated with the image of the document. The text data may indicate strings of characters, such as numbers, words, phrases, sentences, and/or the like, of the document.

As further shown in FIG. 1A, and by reference number 125, the document management system 110 may identify and/or detect one or more tables (e.g., one or more tables of information) in the image of the document. In some implementations, the document management system 110 may process (e.g., using a table-based objection detection technique) the document image data and/or the text data to identify a table in the image of the document. For example, the document management system 110 may process the document image data and/or the text data to identify a portion of the image of the document that includes strings of characters, such as numbers, words, phrases, sentences, and/or the like, organized and/or arranged in a format that includes at least one row, column, header, cell, divider, and/or the like.

In some implementations, the document management system 110 may process the image data and/or the text data using a machine learning model to identify and/or detect a table in the image of the document. For example, the document management system 110 may use a machine learning model that includes one or more neural networks to process the image data and/or the text data to identify a table in the image of the document. The one or more neural networks may include a neural network trained to identify configurations of table markings (e.g., lines, dividers, borders, headers, footers, and/or the like); a neural network trained to identify arrangements of text (e.g., rows, columns, and/or the like of text); a neural network trained to identify table identifiers (e.g., text indicative of a table, such as "table," "cell," "row," "column," and/or the like); a neural network trained to identify types of tables associated with particular types of documents (e.g. a payment schedule table for a contract, a profit and loss table for an accounting document, and/or the like); and/or the like.

The machine learning model may have been trained based on training data that includes images of documents, configurations of tables in the images, identifications of the tables in the images (e.g., based on table markings associated with the tables, text columns associated with the tables, text rows associated with the tables, table identifiers associated with the tables, and/or the like), and/or the like. The documents may include one or more sets of documents, where each set of documents includes documents that are the same type of document, that have a same type of table (e.g., in terms of information content, table structure, table formatting, and/or the like); that are associated with the same entity (e.g., the same individual, organization, company, and/or the like); and/or the like. Using the training data as input to the machine learning model, the machine learning model may be trained to identify one or more relationships in the training data (e.g., between the images, the configurations of the tables in the images, the identifications of the tables, and/or the like) to identify and/or detect tables in various images of documents. The machine learning model may be trained and/or used in a similar manner to that described below with respect to FIG. 2.

In some implementations, the document management system 110 may verify that the table includes a single table. For example, the document management system 110 may verify that the table includes a single table based on header information of the table, a table identifier of the table, table markings of the table (e.g., that are indicated by the document image data and/or the text data). When the document management system 110 determines that the table is not a single table (e.g., the table comprises one or more separate tables), the document management system 110 may process image data and/or the text data associated with individual portions of the image of the document to identify each separate table (e.g., in a similar manner as that described above). Alternatively, when the document management system 110 verifies that the table includes a single table, the document management system 110 may perform one or more operations described herein in relation to FIGS. 1B-1D.

Figure 1B:
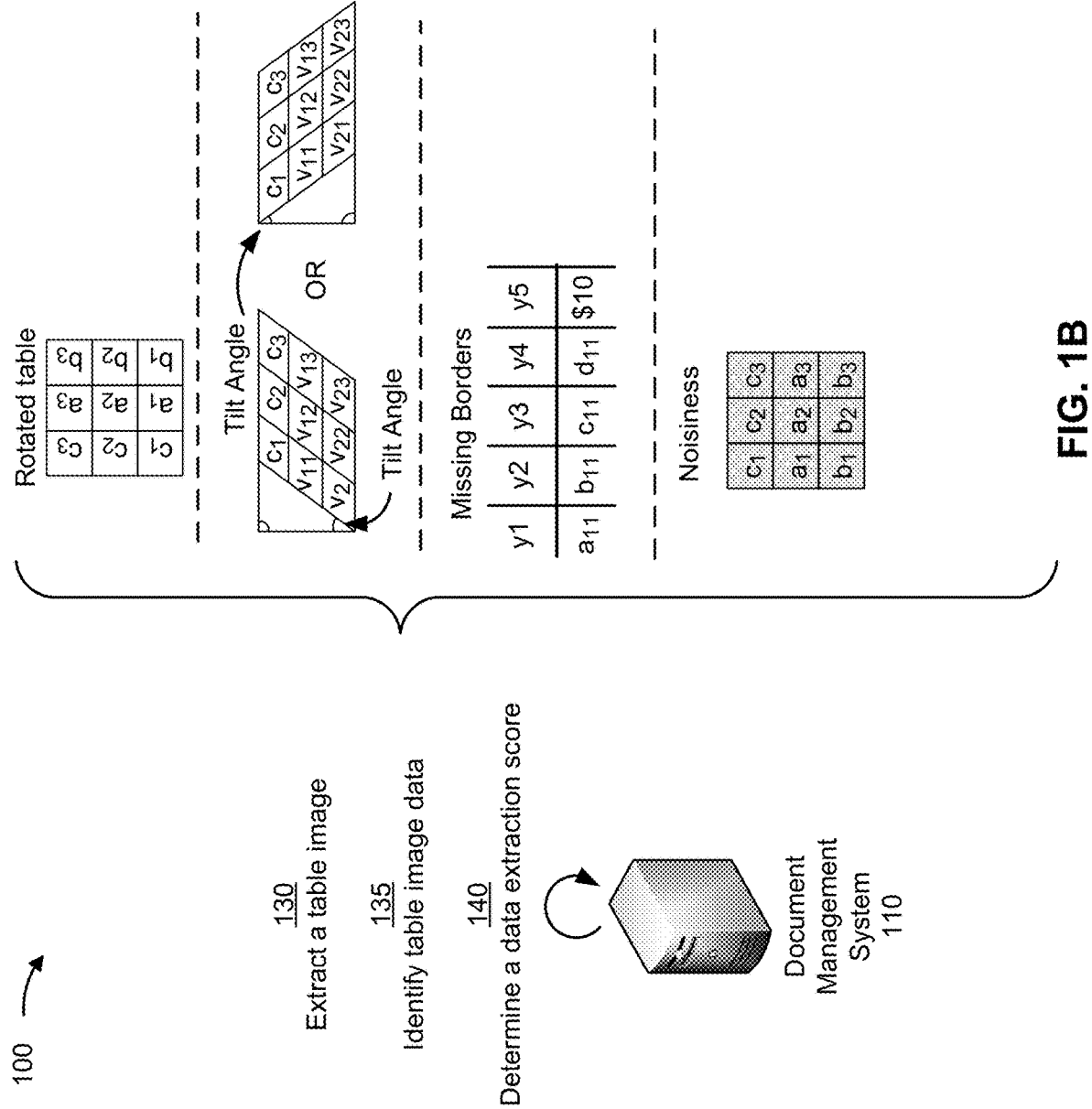

As shown in FIG. 1B, and by reference number 130, the document management system 110 may extract a table image that depicts the table from the image of the document (e.g., that depicts the portion of the image of the document that includes the table). For example, the document management system 110 may extract the table image by cropping the image of the document to include only the portion of the image of the document that includes the table.

As further shown in FIG. 1B, and by reference number 135, the document management system 110 may analyze the table image to identify table image data associated with the table from the table image. The table image data may indicate configurations of table markings (e.g., lines, dividers, borders, headers, footers, and/or the like) of the table image, arrangements of text (e.g., rows, columns, and/or the like, of text) of the table image, table identifiers (e.g., text indicative of a table, such as "table," "cell," "row," "column," and/or the like) of the table image, and/or the like. For example, the table image data may indicate a rotational angle of the table in the table image (e.g., that the table is rotated 90 degrees counter-clockwise in the table image, as shown in FIG. 1B). As another example, the table image data may indicate a tilt angle of the table in the table image (e.g., an angle between lines associated with rows of the table in the table image and the lines associated with columns of the table in the table image, as shown in FIG. 1B). In another example, the table image data may indicate whether the table is missing any borders in the table image (e.g., between rows, columns, cells, headers, footers, and/or the like of the table in the table image). In an additional example, the table image data may indicate an amount of noise associated with the table image (e.g., that affects a legibility and/or readability of information included in the table). The table image data may be associated with one or more issues, such as a rotation issue (e.g., the table is rotated more than an threshold number of degrees in the table image), a tilt angle issue (e.g., the table is tilted more than a threshold number of degrees in the table image), a missing border issue (e.g., between rows, columns, headers, footers, and/or the like of the table in the table image), a table image noise issue (e.g., an amount of noise associated with the table image is greater than a noise threshold), and/or the like.

As further shown in FIG. 1B, and by reference number 140, the document management system 110 may determine a data extraction score associated with the table image (e.g., based on the table image data). The data extraction score may indicate a likelihood that the table image can successfully be digitized in its current form. For example, the data extraction score may indicate whether the table image can be converted to digitized table data using a data conversion technique, such as an OCR technique (e.g., without performing a morphological operation, as described herein in relation to FIG. 1C and reference number 145).

In some implementations, the document management system 110 may process the table image data using an additional machine learning model to determine the data extraction score. The additional machine learning model may have been trained based on training data that includes table image data (e.g., associated with table images), determinations of data extraction scores associated with the historical table data, and/or the like. Using the historical data as input to the additional machine learning model, the additional machine learning model may be trained to identify one or more relationships in the training data (e.g., between the table data, the determinations of data extraction scores, and/or the like) to determine data extraction scores for various table image data. The additional machine learning model may be trained and/or used in a similar manner to that described below with respect to FIG. 2.

In some implementations, the document management system 110 may determine whether the data extraction score satisfies (e.g., is greater than or equal to) a threshold (e.g., a threshold associated with successfully converting the table image to digitized table data using the data conversion technique). When the document management system 110 determines that the extraction score satisfies the threshold, the document management system 110 may process the table image using the data conversion technique (e.g., in a similar manner as that described herein in relation to FIG. 1D and reference number 150).

Figure 1C:
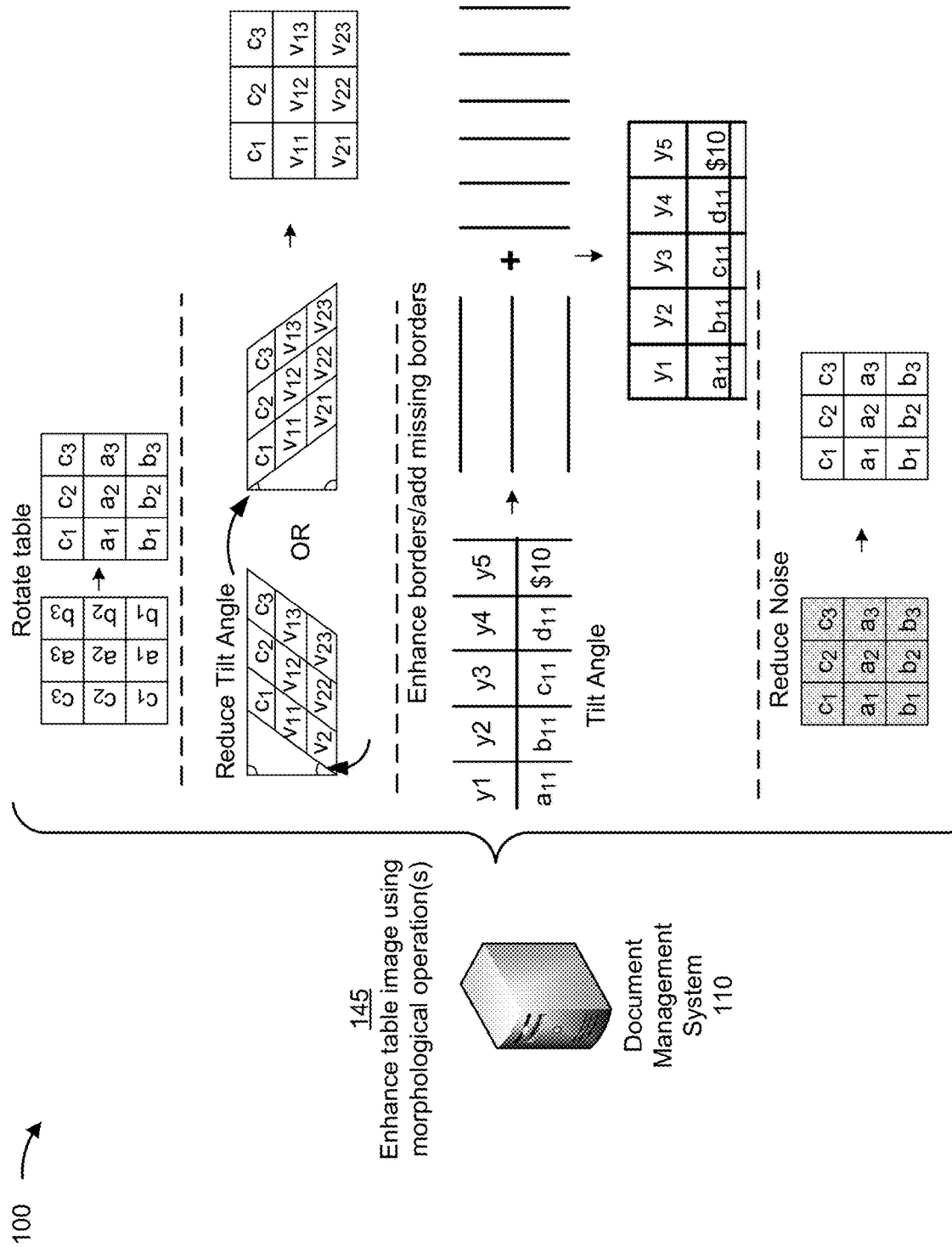

As shown in FIG. 1C, and by reference number 145, when the document management system 110 determines that the extraction score does not satisfy the threshold, the document management system 110 may determine that the table image is to be enhanced. In some implementations, the document management system 110 may perform one or more morphological operations to the table image to generate an enhanced table image. The one or more morphological operations may comprise a rotation of the table in the table image (e.g., to reduce or remove a rotational angle of the table in the table image); a reduction to a tilt of the table image (e.g., to reduce or remove a tilt angle of the table in the table image); an addition and/or enhancement of borders, lines, dividers, and/or the like, of the table image; a reduction to noise of the table image (e.g., to reduce noise associated with the table in the table image); and/or the like.

For example, to rotate the table in the table image, the document management system 110 may determine (e.g., based on the table image data) the rotational angle of the table in the table image and cause the table to be rotated in an opposite direction equal to the rotational angle (e.g., cause the table to be rotated $-\theta°$ when the rotational angle is $\theta°$) in the enhanced table image. The document management system 110 may rotate the table in the table image when the rotational angle satisfies (e.g., is greater than or equal) to a threshold rotational angle.

As another example, to reduce the tilt of the table image, the document management system 110 may determine (e.g., based on the table image data) the tilt angle of the table in the table image and cause the table to be tilted in an opposite direction equal to the tilt angle (e.g., cause the table to be tilted $-\theta°$ when the tilt angle is $\theta°$) in the enhanced table image. The document management system 110 may tilt the table in the table in the table image when the tilt angle satisfies (e.g., is greater than or equal) to a threshold tilt angle.

In an additional example, to add and/or enhance borders, lines, dividers, and/or the like, of the table image, the document management system 110 may identify vertical and/or horizontal division lines (e.g., composed of white space) associated with the table image and may generate (e.g., based on the vertical and/or horizontal division lines) borders, lines, dividers, and/or the like to add to the table image and thereby depict each cell, header, footer, and/or the like of the table as enclosed in the enhanced table image. The document management system 110 may add and/or enhance borders, lines dividers, and/or the like, of the table image the table image when the table image data indicates that a threshold percentage of the table depicted in the table image is missing borders, lines, dividers, and/or the like.

In another example, to reduce noise associated with the table image, the document management system 110 may apply a noise reduction image processing technique (e.g., a smoothing processing technique, a median filtering processing technique, and/or the like) to the table image to generate the enhanced table image. The document management system 110 may apply the noise reduction image processing technique to the table image when the amount of noise associated with the table image satisfies (e.g., is greater than or equal to) a noise threshold.

Figure 1D:
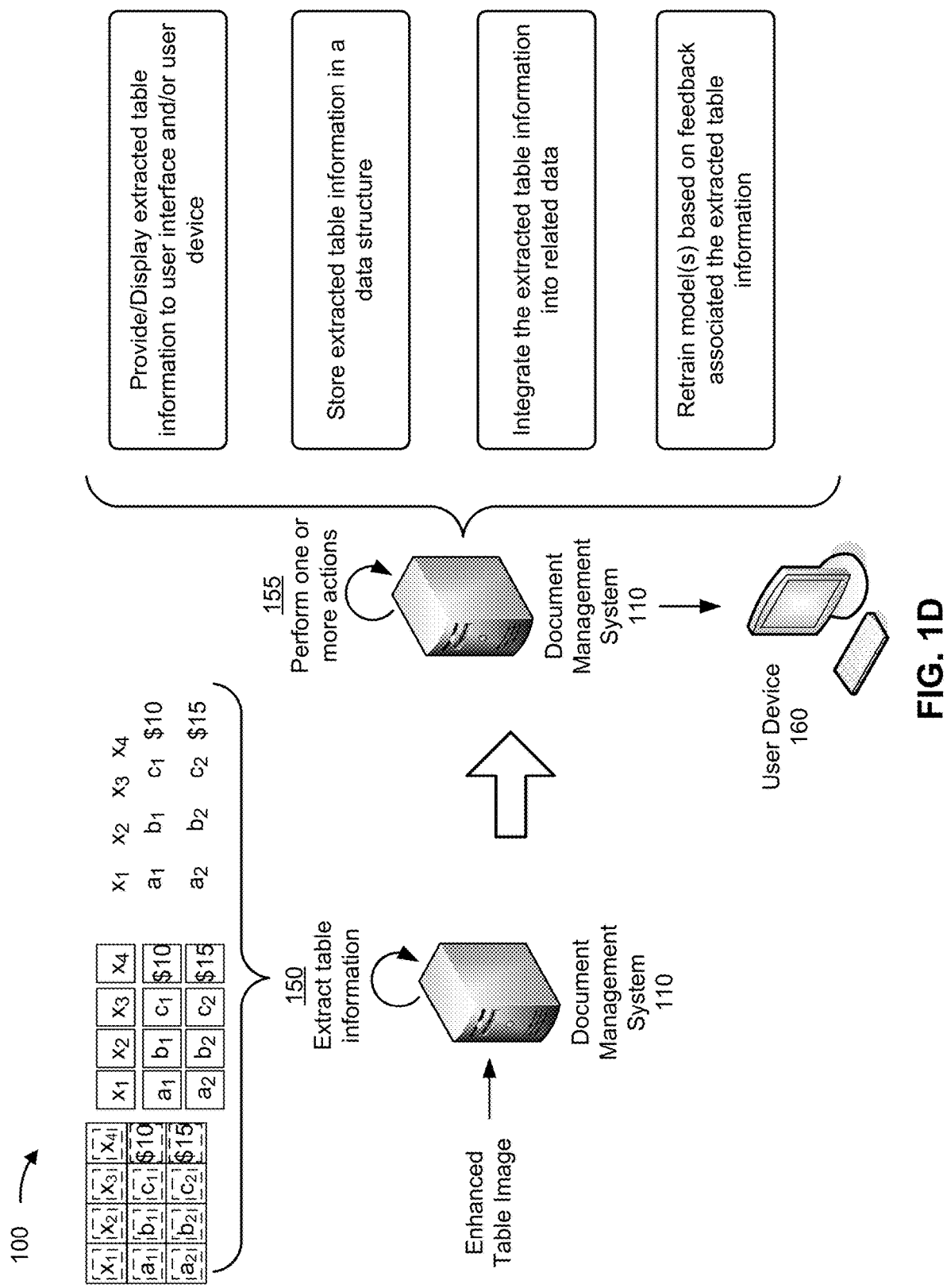

As shown in FIG. 1D, and by reference number 150, the document management system 110 may process the enhanced table image to extract table information from the enhanced table image (e.g., information that indicates the text of each header, each footer, each cell, and/or the like of the table depicted in the enhanced table image). In some implementations, the document management system 110 may process the enhanced table image using a data conversion technique, such as an OCR technique, to extract the table information from the enhanced table. In some implementations, the document management system 110 may perform a position-based extraction on the enhanced table image to identify fields (e.g., cells, headers, footers, and/or the like) of the table in the enhanced table image based on table markings of the enhanced table image (e.g., that indicate respective positions of the fields of the table). Additionally, or alternatively, the document management system 110 may perform text-based extraction on the enhanced table to identify text within the fields of the table in the enhanced table image.

As shown in FIG. 1D, and by reference number 155, the document management system 110 may perform one or more actions associated with the extracted table information.

The one or more actions may include the document management system 110 providing the extracted table information to a user interface and/or to a user device 160. For example, the document management system 110 may automatically provide the extracted table information to users associated with processing the image of the document, to end-users (e.g., vendors, customers, applicants, providers, and/or the like) of processes associated with the document, and/or the like. In this way, the document management system 110 may enable a user or an end-user associated with the user device 160 to consume, apply, process, confirm, and/or the like the extracted table information. For example, if the extracted table information is associated a payment schedule of a contract, a party to the contract may utilize the extracted table information to determine when and/or how payments are to be made according to the payment schedule. This may conserve computing resources, networking resources, human resources, and/or the like that would have otherwise been consumed to manually search for the payment schedule in the contract, digitize the payment schedule, correct the digitized payment schedule, and/or provide the digitized payment schedule.

The one or more actions may include the document management system 110 storing the extracted table information in a data structure (e.g., in association with a digitized version of the document). For example, the processing platform may store the extracted table information (e.g., in an entry associated with the digitized version of the document) in a data structure, such as a database, a table, a list, and/or the like, associated with the document management system 110. The user device 160 may access the extracted table information from the data structure and display the extracted table information, portions of the extracted table information, the digitized document, and/or the like. In this way, a user may quickly and/or easily obtain the extracted table information, the digitized document, and/or the like.

The one or more actions may include integrating the extracted table information into related data associated with related documents that are associated with the document. For example, the document management system 110 may identify related data associated with the extracted table information (e.g., related data, such as other extracted table information, that is associated with related documents that are associated with the document, such as amendments to documents that are associated with a contract). The document management system 110 may integrate the extracted table information with the related data (e.g., link the extracted table information to the related data in the data structure of the document management system 110). In this way, a user may quickly and/or easily obtain the extracted table information, the related data, and/or the like.

The one or more actions may include retraining, based on feedback associated with the extracted table information, the machine learning model. For example, a user of the user device 160 may provide feedback (e.g., regarding the quality of the extracted table information, the accuracy of the extracted table information, and/or the like) to the document management system 110 and the document management system 110 may retrain the machine learning model based on the feedback. In this way, the document management system 110 may improve the accuracy of the machine learning model, which may improve speed and efficiency of the machine learning model and conserve computing resources, network resources, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
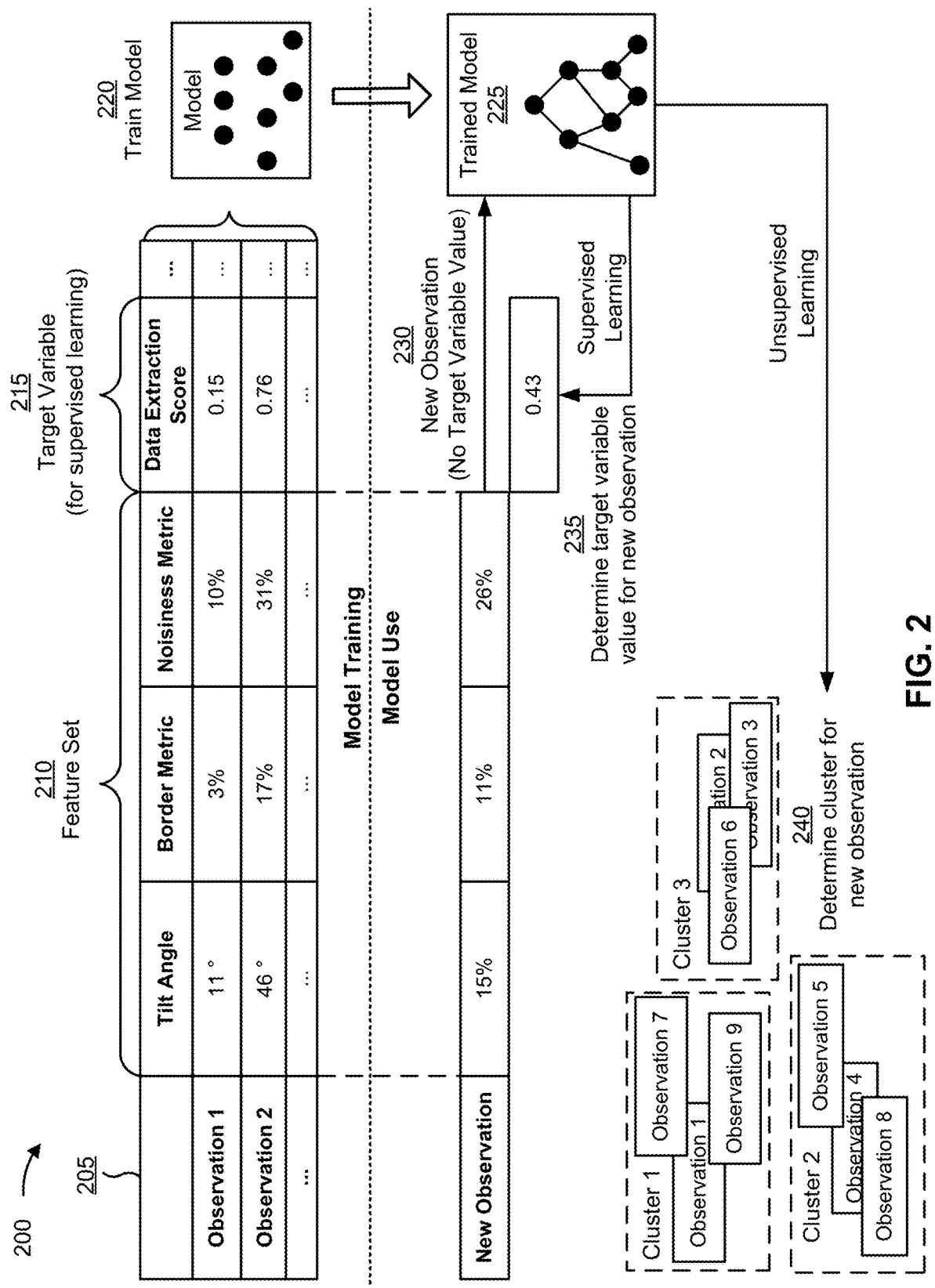
FIG. 2 is a diagram illustrating an example of training a machine learning model and applying a trained machine learning model to a new observation.

FIG. 2 is a diagram illustrating an example 200 of training and using a machine learning model in connection with determining a data extraction score. The machine learning model training and usage described herein may be performed using a machine learning system. The machine learning system may include or may be included in a computing device, a server, a cloud computing environment, and/or the like, such as the document management system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the document storage device 105, the document management system 110, and/or the like as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the document storage device 105, the document management system 110, and/or the like. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a tilt angle (e.g., of a table in a table image), a second feature of border metric (e.g., indicating a percentage, or other metric, of missing borders of a table in a table image), a third feature of a noisiness metric (e.g., indicating a percentage, or other metric, of noise associated with the table image), and so on. As shown, for a first observation, the first feature may have a value of 11°, the second feature may have a value of 3%, the third feature may have a value of 10%, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is a data extraction score, which has a value of 0.15 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of 15°, a second feature of 11%, a third feature of 26%, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of 0.46 for the target variable of the data extraction score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, performing one or more morphological operations to enhance the table image. The first automated action may include, for example, automatically performing the one or more morphological operations to enhance the table image.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., one or more morphological operations needed), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determining a data extraction score. The machine learning system enables recognition and/or identification of tens, hundreds, thousands, or millions of features and/or feature values for tens, hundreds, thousands, or millions of observations, thereby increasing accuracy and consistency and reducing delay associated with determining the data extraction score relative to requiring computing resources to be allocated for tens, hundreds, or thousands of operators to manually determining the data extraction score using the features or feature values.

As indicated above, FIG. 2 is provided as an example. Other examples may differ from what is described in connection with FIG. 2.

Figure 3:
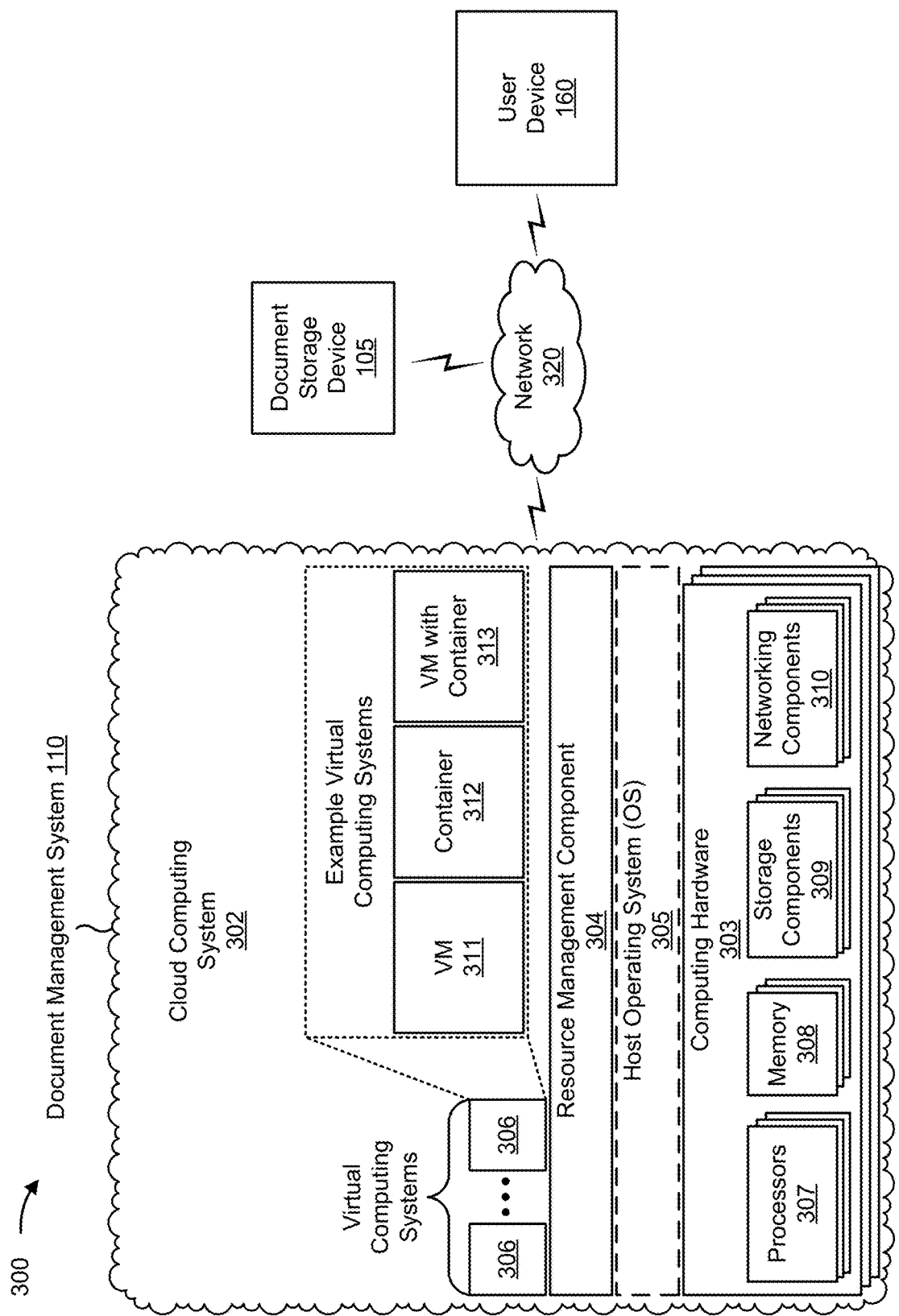
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a document management system 110, which may include one or more elements of and/or may execute within a cloud computing system 302. The cloud computing system 302 may include one or more elements 303-313, as described in more detail below. As further shown in FIG. 3, environment 300 may include a network 320, a user device 160, and/or a document storage device 105. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the document management system 110 may include one or more elements 303-313 of the cloud computing system 302, may execute within the cloud computing system 302, and/or may be hosted within the cloud computing system 302, in some implementations, the document management system 110 may not be cloud-based (e.g., may be implemented outside of a cloud computing system) or may be partially cloud-based. For example, the document management system 110 may include one or more devices that are not part of the cloud computing system 302, such as device 400 of FIG. 4, which may include a standalone server or another type of computing device. The document management system 110 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The user device 160 includes one or more devices capable of receiving, generating, storing, processing, and/or providing information, as described elsewhere herein. The user device 160 may include a communication device and/or a computing device. For example, the user device 160 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 160 may communicate with one or more other devices of environment 300, as described elsewhere herein. In some implementations, the user device 160 may display, to a user of user device 160, extracted table information provided by the document management system 110.

The document storage device 105 includes one or more devices capable of receiving, generating, storing, processing, providing, and/or routing information, as described elsewhere herein. The document storage device 105 may include a communication device and/or a computing device. For example, the document storage device 105 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The document storage device 105 may communicate with one or more other devices of environment 300, as described elsewhere herein. In some implementations, the document storage device 105 may store extracted table information provided by the document management system 110.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
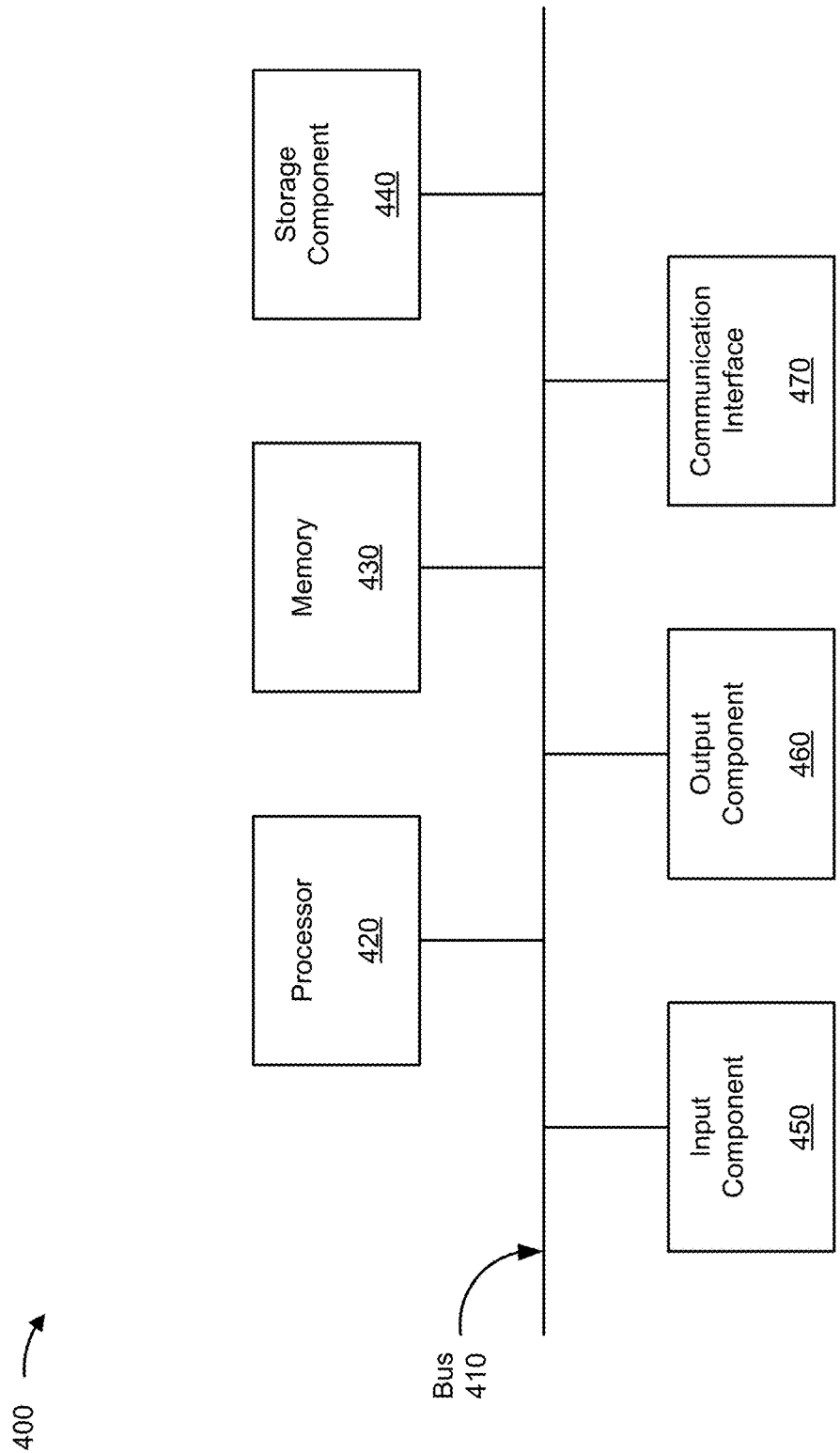
FIG. 4 is a diagram of example components of one or more devices of FIG. 3.

FIG. 4 is a diagram of example components of a device 400, which may correspond to document management system 110, computing hardware 303, user device 160, and/or document storage device 105. In some implementations, document management system 110, computing hardware 303, user device 160, and/or document storage device 105 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
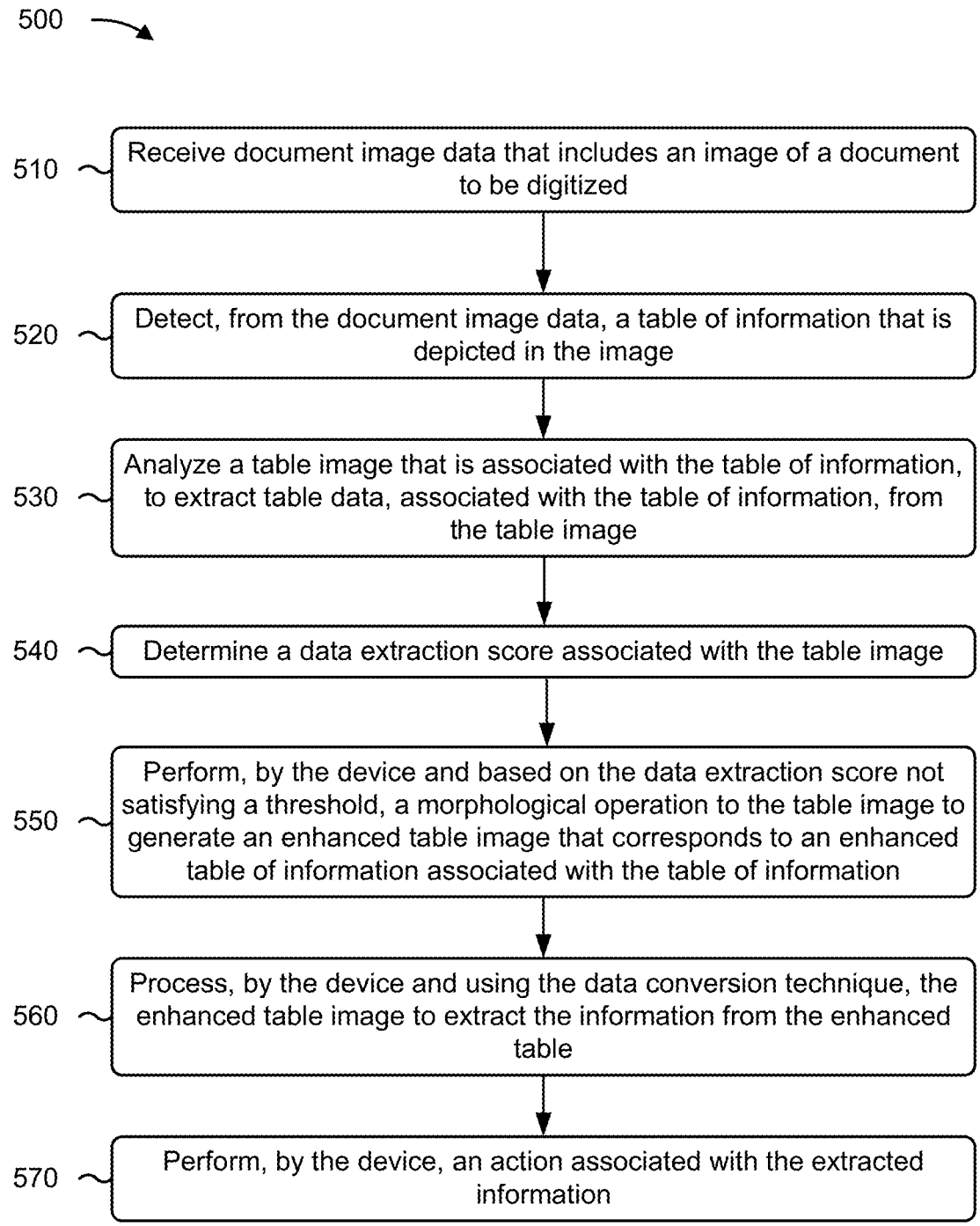
FIG. 5 is a flow chart of an example process relating to processing a table of information in a document.

FIG. 5 is a flowchart of an example process 500 associated with processing a table of information in a document. In some implementations, one or more process blocks of FIG. 5 may be performed by a device (e.g., document management system 110). In some implementations, one or more process blocks of FIG. 5 may be performed by another device or a group of devices separate from or including the device, such as document storage device 105, user device 160, computing hardware 303, and/or the like. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving document image data that includes an image of a document to be digitized (block 510). For example, the device may receive document image data that includes an image of a document to be digitized, as described above.

As further shown in FIG. 5, process 500 may include detecting, from the document image data, a table of information that is depicted in the image (block 520). For example, the device may detect, from the document image data, a table of information that is depicted in the image, as described above. In some implementations, the table of information is detected using a machine learning model that is trained to detect tables based on at least one of table markings associated with historical tables depicted in historical images of historical documents, text columns associated with the historical tables, text rows associated with the historical tables, or table identifiers associated with the historical tables. The historical documents are associated with the document based on the historical documents and the document involving least one of a same type of document, a same type of table, or a same individual or organization.

In some implementations, the machine learning model comprises at least one of a neural network trained to identify configurations of table markings, a neural network trained to identify arrangements of text, a neural network trained to identify table identifiers, or a neural network trained to identify types of tables associated with the document.

As further shown in FIG. 5, process 500 may include analyzing a table image that is associated with the table of information, to extract table data, associated with the table of information, from the table image (block 530). For example, the device may analyze a table image that is associated with the table of information, to extract table data, associated with the table of information, from the table image, as described above. In some implementations, process 500 includes prior to analyzing the table image, verifying that the table of information includes a single table based on at least one of header information of the table of information, a table identifier of the table of information, or table markings of the table of information. In some implementations, process 500 includes prior to analyzing the table image, extracting the table image from an image of a document that depicts the table of information, wherein the table of information was identified using a machine learning model that is trained to detect tables.

As further shown in FIG. 5, process 500 may include determining a data extraction score associated with the table image (block 540). For example, the device may determine a data extraction score associated with the table image, as described above. In some implementations, the data extraction score is associated with using a data conversion technique to convert the table image to digitized table data, is representative of a probability that the data conversion technique can be used to convert the table image to digitized table data, and/or the like. In some implementations, the data extraction score is determined based on at least one of a rotational position of the table, a tilt angle of the table, or an amount of noise associated with the table.

As further shown in FIG. 5, process 500 may include performing, based on the data extraction score not satisfying a threshold, a morphological operation to the table image to generate an enhanced table image that corresponds to an enhanced table of information associated with the table of information (block 550). For example, the device may perform, based on the data extraction score not satisfying a threshold, a morphological operation to the table image to generate an enhanced table image that corresponds to an enhanced table of information associated with the table of information, as described above. In some implementations, process 500 includes prior to performing the morphological operation, determining that the data extraction score is associated with an issue that prevents the data conversion technique from being able to convert the table image to digitized table data, and selecting, from a plurality of morphological operations, the morphological operation based on the issue.

In some implementations, the morphological operation comprises at least one of a rotation of the table image, a reduction to a tilt of the table, or a reduction of an amount of noise associated with the table. In some implementations, performing the morphological operation includes determining, based on an analysis of the table image, an issue associated with using the data conversion technique to extract the information from the table, selecting, from a plurality of morphological operations, the morphological operation that is associated with the issue, and applying the morphological operation to the table image. The issue comprises at least one of the table being rotated in the table image relative to other text of the document, the table being tilted in the table image, table markings of the table being unclear, or text of the table being unclear.

As further shown in FIG. 5, process 500 may include processing, using the data conversion technique, the enhanced table image to extract the information from the enhanced table (block 560). For example, the device may process, using the data conversion technique, the enhanced table image to extract the information from the enhanced table, as described above. In some implementations, process 500 includes performing a position-based extraction on the enhanced table image to identify fields of the table in the enhanced table image based on table markings of the enhanced table image, or performing text-based extraction on the enhanced table to identify text within the fields of the table in the enhanced table image.

As further shown in FIG. 5, process 500 may include performing an action associated with the extracted information (block 570). For example, the device may perform an action associated with the extracted information, as described above. In some implementations, performing the action comprises at least one of providing, via a display of a user interface, the information, storing the information in a data structure in association with a digitized version of the document, integrating the information into related data associated with related documents that are associated with the document, or retraining, based on feedback associated with the information, a machine learning model associated with identifying the table and performing the morphological operation. Storing the extracted information as digitized table data includes at least one of identifying related data associated with the extracted information, wherein the related data is associated with related documents that are associated with the document, and integrating the information with the related data associated with the related documents that are associated with the document.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, document image data that includes an image of a document to be digitized;
detecting, by the device and from the document image data, a table of information that is depicted in the image;
analyzing, by the device, a table image that is associated with the table of information, to extract table data, associated with the table of information, from the table image;
determining, by the device, a data extraction score associated with the table image,
wherein the data extraction score is associated with using a data conversion technique to convert the table image to digitized table data;
performing, by the device and based on the data extraction score not satisfying a threshold, a morphological operation to the table image to generate an enhanced table image that corresponds to an enhanced table of information associated with the table of information;
processing, by the device and using the data conversion technique, the enhanced table image to extract the information from the enhanced table; and
performing, by the device, an action associated with the extracted information.

2. The method of claim 1, wherein the table of information is detected using a machine learning model that is trained to detect tables based on at least one of:
table markings associated with historical tables depicted in historical images of historical documents;
text columns associated with the historical tables;
text rows associated with the historical tables; or
table identifiers associated with the historical tables.

3. The method of claim 2, wherein the historical documents are associated with the document based on the historical documents and the document involving least one of:
a same type of document;
a same type of table; or
a same individual or organization.

4. The method of claim 1, further comprising:
prior to analyzing the table image, verifying that the table of information includes a single table based on at least one of:
header information of the table of information;
a table identifier of the table of information; or
table markings of the table of information.

5. The method of claim 1, wherein the data extraction score is determined based on at least one of:
a rotational position of the table;
a tilt angle of the table; or
a amount of noise associated with the table.

6. The method of claim 1, wherein the morphological operation comprises at least one of:
a rotation of the table image;
a reduction to a tilt of the table; or
a reduction of an amount of noise associated with the table.

7. The method of claim 1, wherein performing the action comprises at least one of:
providing, via a display of a user interface, the information;
storing the information in a data structure in association with a digitized version of the document;
integrating the information into related data associated with related documents that are associated with the document; or
retraining, based on feedback associated with the information, a machine learning model associated with identifying the table and performing the morphological operation.

8. A device, comprising:
one or more processors configured to:
identify, using a table detection model, a table of information that is depicted in an image of a document;
extract, from the image of the document, a table image that depicts the table of information;
determine, based on a data extraction score associated with the table image, that the table of information is to be enhanced;
perform, based on the data extraction score indicating that the table image is to be enhanced, a morphological operation to the table image to generate an enhanced table image that corresponds to an enhanced table of information associated with the table of information;
process, using a data conversion technique, the enhanced table image to extract the information from the table; and
store the information as digitized table data.

9. The device of claim 8, wherein the table detection model comprises a machine learning model that is trained to detect tables based on historical images of historical documents that are associated with the document and historical configurations of tables that are depicted in the historical images.

10. The device of claim 9, wherein the machine learning model comprises at least one of:
a neural network trained to identify configurations of table markings;
a neural network trained to identify arrangements of text;
a neural network trained to identify table identifiers; or
a neural network trained to identify types of tables associated with the document.

11. The device of claim 8, wherein the data extraction score is representative of a probability that the data conversion technique can be used to convert the table image to digitized table data.

12. The device of claim 8, wherein the one or more processors are further configured to, when performing the morphological operation:
determine, based on an analysis of the table image, an issue associated with using the data conversion technique to extract the information from the table;
select, from a plurality of morphological operations, the morphological operation that is associated with the issue; and
apply the morphological operation to the table image.

13. The device of claim 12, wherein the issue comprises at least one of:
the table being rotated in the table image relative to other text of the document;
the table being tilted in the table image;
table markings of the table being unclear; or
text of the table being unclear.

14. The device of claim 8, wherein the one or more processors are further configured to, when storing the extracted information as digitized table data, at least one of:
identify related data associated with the extracted information,
wherein the related data is associated with related documents that are associated with the document; and
integrate the information with the related data associated with the related documents that are associated with the document.

15. A non-transitory computer-readable medium storing a set of instructions, the set of instructions comprising:
one or more instructions that, when executed by one or more processors of a device, cause the device to:
analyze a table image that is associated with a table of information, to extract table image data from the table image;
determine a data extraction score associated with the table image data,
wherein the data extraction score is associated with whether a data conversion technique can be used to convert the table image data to digitized table data;

perform, based on the data extraction score not satisfying a threshold, a morphological operation to the table image data to generate an enhanced table image that corresponds to an enhanced table of information associated with the table of information;

process, using the data conversion technique, the enhanced table image to extract the information from the enhanced table image; and perform an action associated with the extracted information.

16. The non-transitory computer-readable medium of claim 15, wherein the one or more instructions, when executed by the one or more processors, further cause the device to:

prior to analyzing the table image, extract the table image from an image of a document that depicts the table of information,
wherein the table of information was identified using a machine learning model that is trained to detect tables.

17. The non-transitory computer-readable medium of claim 15, wherein the one or more instructions, when executed by the one or more processors, further cause the device to:

prior to performing the morphological operation, determine that the data extraction score is associated with an issue that prevents the data conversion technique from being able to convert the table image to digitized table data; and select, from a plurality of morphological operations, the morphological operation based on the issue.

18. The non-transitory computer-readable medium of claim 17, wherein the issue comprises at least one of:

the table being rotated in the table image relative to other text in a document that includes the table;

the table being tilted in the table image;

table markings of the table being unclear; or text of the table being unclear.

19. The non-transitory computer-readable medium of claim 15, wherein the one or more instructions, that cause the device to process the enhanced table image, cause the device to:

perform a position-based extraction on the enhanced table image to identify fields of the table in the enhanced table image based on table markings of the enhanced table image; or perform text-based extraction on the enhanced table to identify text within the fields of the table in the enhanced table image.

20. The non-transitory computer-readable medium of claim 15, wherein the one or more instructions, that cause the device to perform the action, cause the device to:

provide, via a display of a user interface, the information;

store the information in a data structure in association with a digitized version of a document that includes the table;

integrate the information into related data associated with related documents that are associated with the document; or retrain, based on feedback associated with the information, a machine learning model associated with identifying the table and performing the morphological operation.

* * * * *